(No Model.)
J. P. VAN VLECK.
GAGE.
No. 572,321. Patented Dec. 1, 1896.
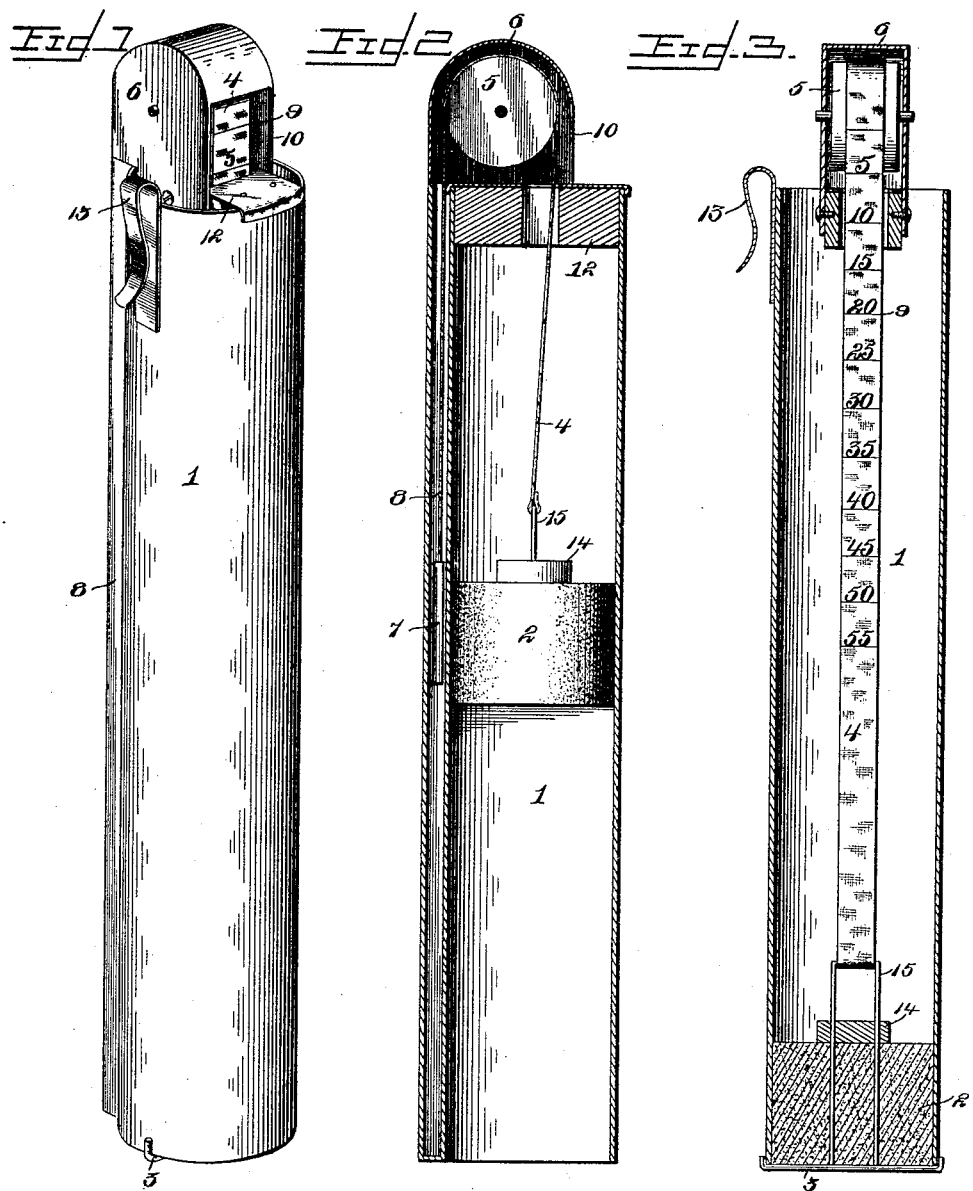
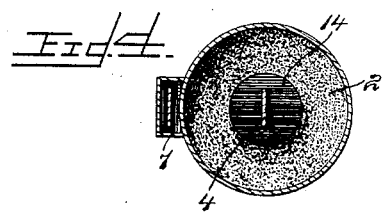
Witnesses
W. J. LaVarre
J. F. Riley
Inventor
John P. Van Vleck.
By his Attorneys,
C. A. Snow & Co.

UNITED STATES PATENT OFFICE.

JOHN P. VAN VLECK, OF COOKSVILLE, WISCONSIN.

GAGE.

SPECIFICATION forming part of Letters Patent No. 572,321, dated December 1, 1896.

Application filed April 3, 1896. Serial No. 586,086. (No model.)

*To all whom it may concern:*

Be it known that I, JOHN P. VAN VLECK, a citizen of the United States, residing at Cooksville, in the county of Rock and State of Wisconsin, have invented a new and useful Gage, of which the following is a specification.

The invention relates to improvements in gages for measuring liquids.

The object of the present invention is to provide a simple and inexpensive portable gage adapted for measuring various kinds of liquids, but particularly to creameries for measuring milk after the latter has passed through a separator to enable such milk to be accurately measured in bulk.

The invention consists in the construction and novel combination and arrangement of parts hereinafter fully described, illustrated in the accompanying drawings, and pointed out in the claim hereto appended.

In the drawings, Figure 1 is a perspective view of a liquid-gage constructed in accordance with this invention. Fig. 2 is a central vertical sectional view. Fig. 3 is a vertical sectional view taken at right angles to Fig. 2. Fig. 4 is a horizontal sectional view.

Like numerals of reference designate corresponding parts in all the figures of the drawings.

1 designates a tubular casing constructed of sheet metal or any other suitable material, and opened at the top and bottom and receiving a float 2, preferably consisting of a cork or the like. The float 2 is retained in the tubular casing by a transverse rod 3, extending across the bottom thereof, and it is connected with one end of a flexible strip or ribbon 4, which passes over a pulley 5, mounted in a suitable casing or housing 6 at the top of the tubular casing 1. The flexible strip or ribbon is provided at its other end with a weight arranged in a vertical tubular way or well 8, closed at its lower end to prevent access of milk or any other liquid to the interior of the well.

The flexible strip or ribbon is provided with graduations 9, and the pulley casing or housing is open at the front at 10 to enable the flexible strip or ribbon and its scale to be readily seen to ascertain at a glance the position of the float and the quantity of liquid in a can or other vessel in which the gage is placed. The weight 7 draws the flexible strip or ribbon over the pulley as the float rises, and a counterbalancing-weight 14 is mounted on the cork to prevent the weight 7 from counteracting or balancing the float. The counterbalancing-weight is provided with perforations and is mounted on a bail 15, which is secured to the float and which has the adjacent end of the flexible ribbon or strip attached to it.

The pulley casing or housing is constructed of sheet metal or other suitable material and is mounted upon a bottom cross-piece 12. The upper portion of the pulley casing or housing is rounded to conform to the pulley, and it is provided at its back with an opening registering with the upper end of the tubular way or well, which is rectangular in cross-section. The cross-piece 12 is fitted within the upper end of the tubular casing 1 and is provided with a slot for the passage of the flexible strip or ribbon, and suitable stops are provided to prevent the cross-bar from being introduced into the casing 1 too far. The pulley casing or housing is readily removable to enable the parts of the gage to be cleaned when necessary. By detaching the casing or housing of the pulley the mechanism is entirely removed from the tubular casing without separating the float, weight, or ribbon from the pulley, and access may then be had to the interior of the casing and the well. A spring catch or hook 13 is provided at the top of the tubular casing to enable the gage to be readily attached to the upper edge of a can or similar receptacle.

It will be seen that the gage, while being capable of use for measuring all kinds of liquids, is especially adapted for use in creameries for measuring milk in bulk, as it is portable, so as to be readily lifted from one can to another, and that it is provided with a resilient catch adapted to engage the upper edge of a can. It will also be apparent that the pulley-casing, together with the ribbon, the float, and the weight, may be readily removed from the tubular casing to permit the parts to be washed, so that no sour milk will collect in the gage.

Changes in the form, proportion, and minor details of construction may be resorted to without departing from the spirit or sacrificing any of the advantages of this invention.

What I claim is—

A portable gage for measuring milk and other liquids, adapted to be readily transferred from one can to another, and comprising a tubular casing open at its lower end and provided with an exterior longitudinally-disposed well closed at its lower end and open at the upper end, a detachable pulley-casing mounted on top of the tubular casing and provided at its front with an opening, a pulley mounted in the pulley-casing, a float arranged within the tubular casing, a weight arranged in the well, a strip or ribbon provided with graduations arranged on the pulley and connected with the weight and the float and adapted to withdraw the same from the well and the tubular casing when the pulley-casing is detached, to permit the parts to be washed, and a resilient catch adapted to engage the upper edge of a can, substantially as and for the purpose described.

In testimony that I claim the foregoing as my own I have hereto affixed my signature in the presence of two witnesses.

JOHN P. VAN VLECK.

Witnesses:
W. R. PHILLIPS,
WILLIAM T. BOYD.